United States Patent
Rayl et al.

(10) Patent No.: US 8,220,436 B2
(45) Date of Patent: *Jul. 17, 2012

(54) HCCI/SI COMBUSTION SWITCHING CONTROL SYSTEM AND METHOD

(75) Inventors: Allen B. Rayl, Waterford, MI (US); Jun-Mo Kang, Ann Arbor, MI (US); Vijay Ramappan, Novi, MI (US); Matthew A. Wiles, Royal Oak, MI (US); Hanho Yun, Oakland Township, MI (US); Peter Kafarnik, Eltville-Erbach (DE)

(73) Assignee: GM Global Technology Operations LLC

( * ) Notice: Subject to any disclaimer, the term of this patent is extended or adjusted under 35 U.S.C. 154(b) by 843 days.

This patent is subject to a terminal disclaimer.

(21) Appl. No.: 12/360,366

(22) Filed: Jan. 27, 2009

(65) Prior Publication Data

US 2009/0229563 A1    Sep. 17, 2009

Related U.S. Application Data

(60) Provisional application No. 61/036,280, filed on Mar. 13, 2008.

(51) Int. Cl.
  *F02B 17/00* (2006.01)
(52) U.S. Cl. ........................................ 123/295; 701/103
(58) Field of Classification Search ................ 123/295, 123/90.15–90.18, 436; 701/101, 102, 103
  See application file for complete search history.

(56) References Cited

U.S. PATENT DOCUMENTS

| | | | |
|---|---|---|---|
| 5,036,668 A | 8/1991 | Hardy | |
| 5,051,909 A | 9/1991 | Gomez et al. | |
| 5,253,619 A | 10/1993 | Richeson et al. | |
| 6,178,943 B1 | 1/2001 | Taga et al. | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,308,682 B1 | 10/2001 | Ma | |
| 6,336,436 B1 | 1/2002 | Miyakubo et al. | |
| 6,343,581 B2 | 2/2002 | Suzuki | |
| 6,390,054 B1 * | 5/2002 | Yang | 123/295 |
| 6,450,136 B1 | 9/2002 | Klomp | |
| 6,463,889 B2 | 10/2002 | Reddy | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,637,393 B2 | 10/2003 | Sutherland | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,769,403 B2 | 8/2004 | Rayl et al. | |
| 6,923,167 B2 | 8/2005 | Flowers | |

(Continued)

FOREIGN PATENT DOCUMENTS

WO  WO2007/017109  2/2007

*Primary Examiner* — Hieu T Vo (57) ABSTRACT

A control system and method for operating an engine includes a spark ignited (SI) control module controlling the engine in a spark ignited mode, a pre-homogeneous charge compression (HCCI) module controlling the engine in an HCCI mode after the spark ignited mode, and an HCCI module controlling the engine in an HCCI mode after the pre-HCCI mode. The SI module controls the engine in the SI mode after the HCCI mode.

19 Claims, 5 Drawing Sheets

U.S. PATENT DOCUMENTS

| | | |
|---|---|---|
| 6,932,175 B2 | 8/2005 | Teraji et al. |
| 6,948,482 B2 | 9/2005 | Kikenny et al. |
| 6,951,201 B2 | 10/2005 | Zhu et al. |
| 6,971,343 B2 | 12/2005 | Hiomi et al. |
| 6,971,365 B1 | 12/2005 | Najt |
| 7,036,482 B2 | 5/2006 | Beck et al. |
| 7,080,613 B2 | 7/2006 | Kuo |
| 7,104,349 B2 | 9/2006 | Gray, Jr. |
| 7,121,254 B2 | 10/2006 | Wickman |
| 7,134,409 B2 | 11/2006 | Mitani et al. |
| 7,168,420 B1 | 1/2007 | Yang |
| 7,274,986 B1 * | 9/2007 | Petridis et al. ............ 123/295 |
| 7,370,616 B2 * | 5/2008 | Kuo et al. ............ 123/90.15 |
| 7,461,628 B2 | 12/2008 | Blumberg et al. |
| 7,478,620 B2 * | 1/2009 | Kuo et al. ............ 123/294 |
| 7,529,637 B2 | 5/2009 | Snyder |
| 7,610,897 B2 | 11/2009 | Rayl |
| 7,729,844 B2 * | 6/2010 | Rayl et al. ............ 701/103 |
| 7,827,944 B2 | 11/2010 | Pierik |
| 7,845,319 B2 | 12/2010 | Rayl |
| 7,866,286 B2 | 1/2011 | Sun |
| 7,974,766 B2 | 7/2011 | Rayl |
| 7,975,668 B2 | 7/2011 | Ramappan et al. |
| 7,979,195 B2 | 7/2011 | Rayl |
| 2004/0182359 A1 | 9/2004 | Stewart et al. |

\* cited by examiner

HCCI/SI COMBUSTION SWITCHING CONTROL SYSTEM AND METHOD

CROSS-REFERENCE TO RELATED APPLICATIONS

This application claims the benefit of U.S. Provisional Application No. 61/036,280, filed on Mar. 13, 2008. The disclosure of the above application is incorporated herein by reference in its entirety.

FIELD OF THE INVENTION

The present invention relates to engine control systems, and more particularly to engine control systems for engines operating in both spark ignition and homogenous charge compression ignition (HCCI) modes.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency and generates lower emission levels as compared to SI mode. However since there is no direct initiator of combustion, the ignition process tends to be more difficult to control.

To adjust operation during the HCCI mode, a control system may alter the conditions that induce combustion. For example, the control system may adjust compression ratios, induced gas temperature, induced gas pressure, or the quantity of retained or reinducted exhaust. Several approaches have been used to perform the adjustments and thus extend the HCCI operating region.

One control approach employs variable valve timing to adjust the compression ratio. For example, the compression ratio can be controlled by adjusting when intake valves close. The amount of exhaust gas retained in a combustion chamber can be controlled by valve re-opening and/or valve overlap.

Another approach uses a "2-step" intake valve lift approach, which includes switching intake valve modes between a HIGH lift state and a LOW lift state. During the HIGH lift state, the intake valves are lifted to a HIGH level to allow for an amount of air to enter the corresponding cylinders. During the LOW lift state, the intake valves are lifted to a LOW level with a shorter duration, which allows a smaller amount of air to enter the corresponding cylinders relative to the HIGH lift state.

Without compensation, the 2-step valve lift approach tends to have abrupt and non-uniform transitions between SI and HCCI modes. In other words, there may be undesirable torque disturbances during the transitions.

SUMMARY

The engine control system according to the present disclosure operates the gasoline engine in the SI mode and the HCCI mode. The HCCI mode reduces fuel consumption but is only available over a limited range of engine torques and speeds.

In one aspect of the disclosure, a method of controlling an engine includes changing engine control from an spark ignited (SI) mode to a pre-homogeneous charge compression (HCCI) mode, changing engine control from the pre-HCCI mode to an HCCI mode and changing engine control from the HCCI mode to the SI mode.

In another aspect of the disclosure, a control system for an engine includes a spark ignited (SI) control module controlling the engine in a spark ignited mode, a pre-homogeneous charge compression (HCCI) module controlling the engine in an HCCI mode after the spark ignited mode, and an HCCI module controlling the engine in an HCCI mode after the pre-HCCI mode. The SI module controls the engine in an SI mode after the HCCI mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the SI mode and the HCCI mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

The engine may be a direct injection gasoline engine and may be selectively operated in a stratified operating mode during the transitions. To operate in the stratified operating mode, the fuel injectors inject the fuel into an area of the cylinder, often a small "sub-cylinder" at the top, or periphery, of the main cylinder. This approach provides a rich charge in that area that ignites easily and burns quickly and smoothly. The combustion process proceeds to a very lean area (often only air) where the flame-front cools rapidly and nitrogen oxides ($NO_x$) have little opportunity to form. The additional oxygen in the lean charge also combines with carbon monoxide (CO) to form carbon dioxide ($CO_2$).

Transitions between the SI mode and the HCCI mode should appear seamless to the driver, minimize engine emissions and minimize fuel consumption losses.

During HCCI operation, the intake manifold pressure may be near atmospheric pressure. Transitions into and out of HCCI involve changes to intake manifold pressure and valve lift. These changes tend to cause sudden changes in air charge supplied to the cylinders. As a result, undesirable changes in engine torque will occur if not properly managed.

The present disclosure describes control systems and methods for transitioning between the SI mode and the HCCI and vice versa. For example only, the present disclosure describes SI to HCCI mode transitions that employ volume matching using cam phasers, spark retard and/or lean operation during the transition for torque smoothing. Immediate HCCI-SI transitions may be performed from any operating mode with option of spark retard and/or lean operation during the transition for torque smoothing. Coordinated switching of valve lift, MAP, fuel, spark, and phaser control modes may be performed during the transitions. The present disclosure also describes event-based coordination of fueling and spark to expected cam lift. Transition switching duration limitations are used to prevent latching in transition states.

Figure 1A:
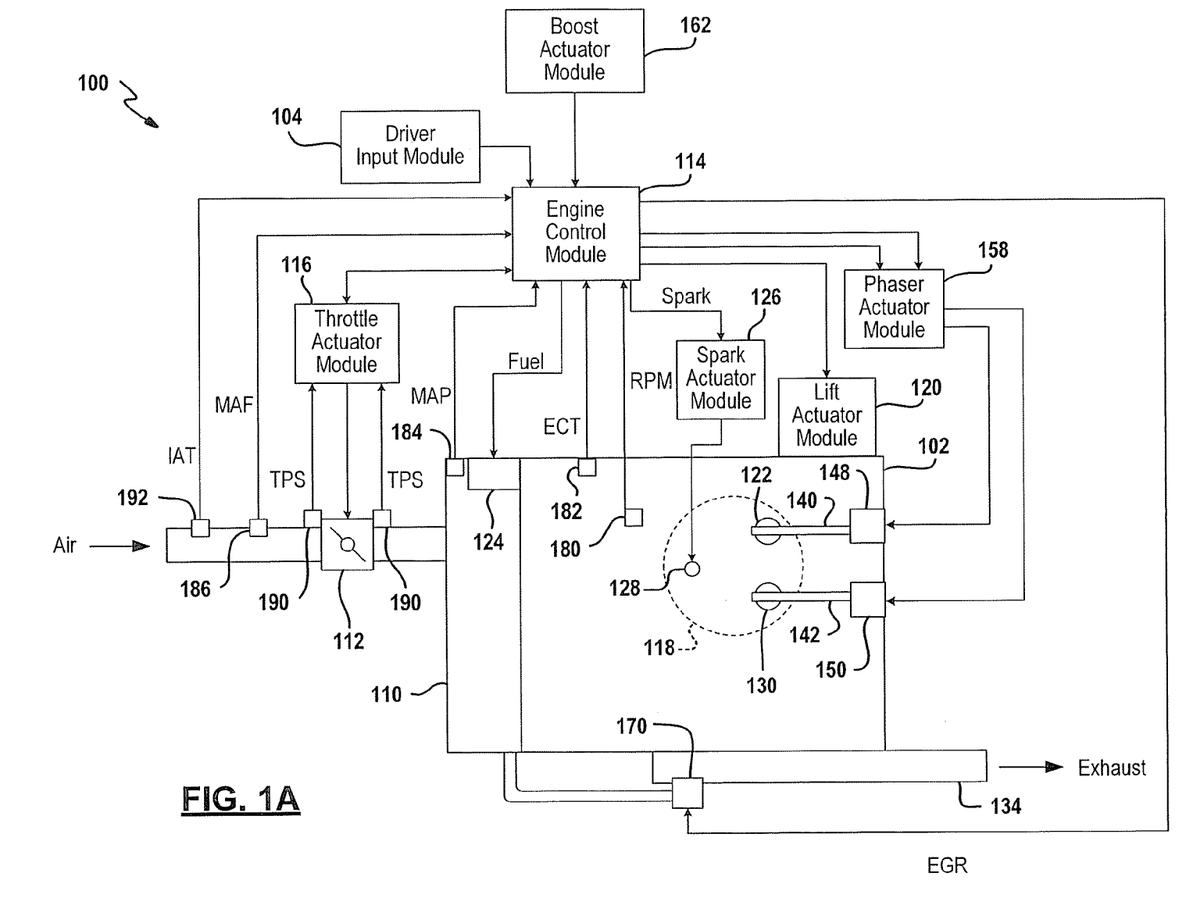
FIG. 1A is a functional block diagram of an engine control system that operates in SI and HCCI combustion modes according to the present disclosure.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The lift actuator module 120 may switch between high and low lift on their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the lift actuator module controls the amount of lift, which may be adjusted hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, the fuel injection system 124, and the lift actuator module 120. The term actuator position with respect to these actuators may correspond to manifold absolute pressure, EGR valve opening, intake and exhaust cam phaser angles, and air/fuel ratio, respectively.

Figure 1B:
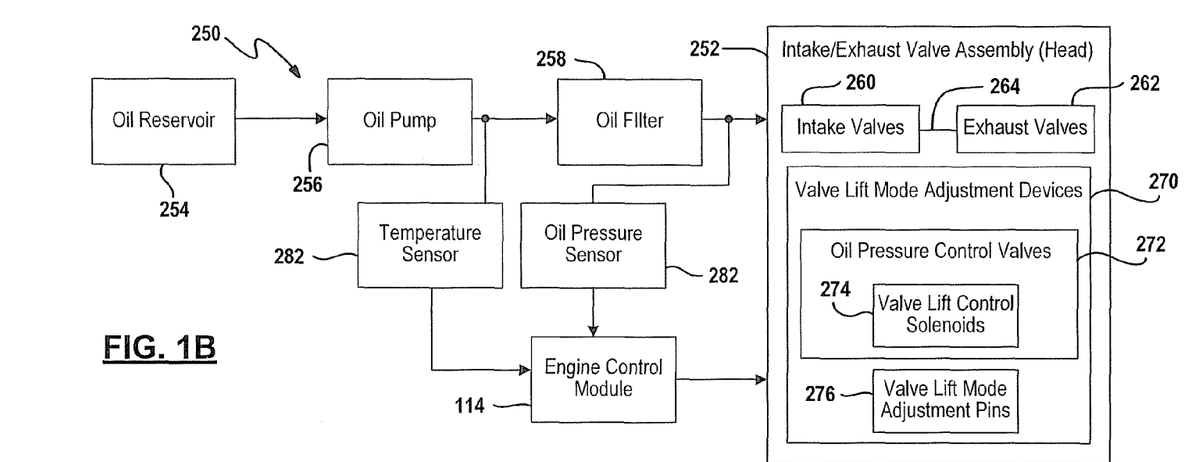
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc may be included.

The valve lift control circuit 250 may include an oil temperature sensor 280 and/or an oil pressure sensor 282. The control module signals the oil pressure control valves 272 based on temperature and pressure signals received from the temperature and pressure sensors 280, 282.

Figure 1C:
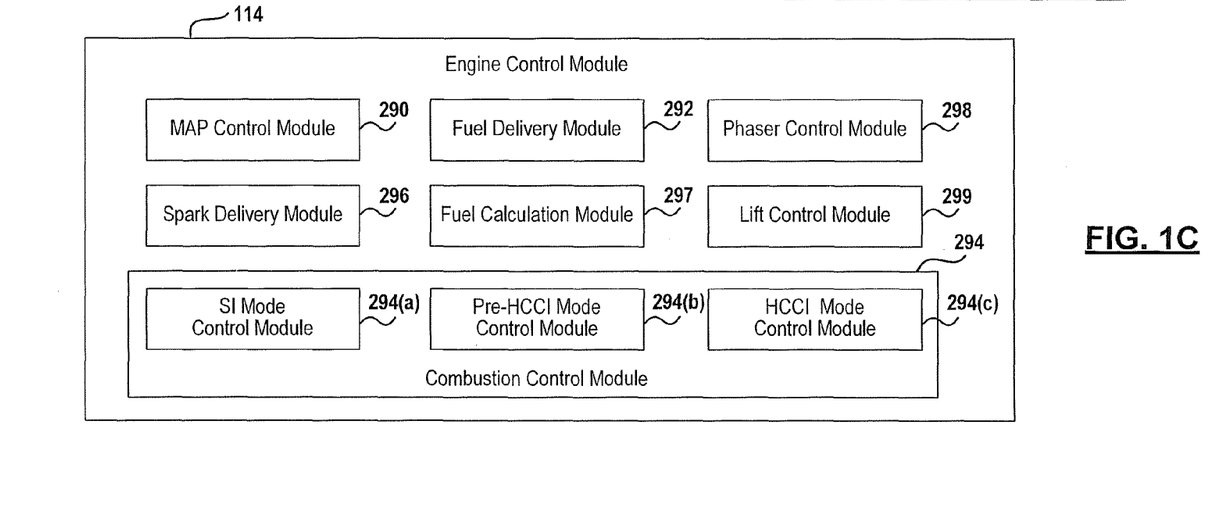
FIG. 1C is a functional block diagram of an exemplary engine control module.

Referring now to FIG. 1C, the engine control module 114 may comprise a map control module 290 having a MAP control mode (MM). The MM can be set to SI and HCCI modes. The engine control module 114 comprises a fuel delivery module 292 having a fuel delivery mode (FM). The fuel delivery module 292 may switch the FM between SI, stratified and HCCI modes. The fuel delivery module 292 may determine the manner, timing and/or amount of fuel delivery.

The engine control module 114 comprises a combustion control module 294 having a combustion mode (CM). The combustion module 294 may switch the CM between SI, HCCI and pre-HCCI modes and include an SI control module 294(a), a pre HCCI control module 294(b) and an HCCI control module 294(c).

The engine control module 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The engine control module 114 comprises a fuel calculation module 297 having a fuel calculation mode (FC). The fuel calculation module 297 may switch the FC between air lead and fuel lead modes. In air lead mode, fuel is controlled based on air. In fuel lead mode, air is controlled based on the measured or delivered fuel.

The engine control module 114 comprises a phaser control module 298 having a phaser control mode (PM). The phaser control module 298 may switch the PM between SI and HCCI modes. The phaser control module 298 may determine cam phasing.

The engine control module 144 comprises a lift control module 299 having a lift control mode (LM). The lift control module 299 may switch the LM between high and low valve lift modes.

Figure 2:
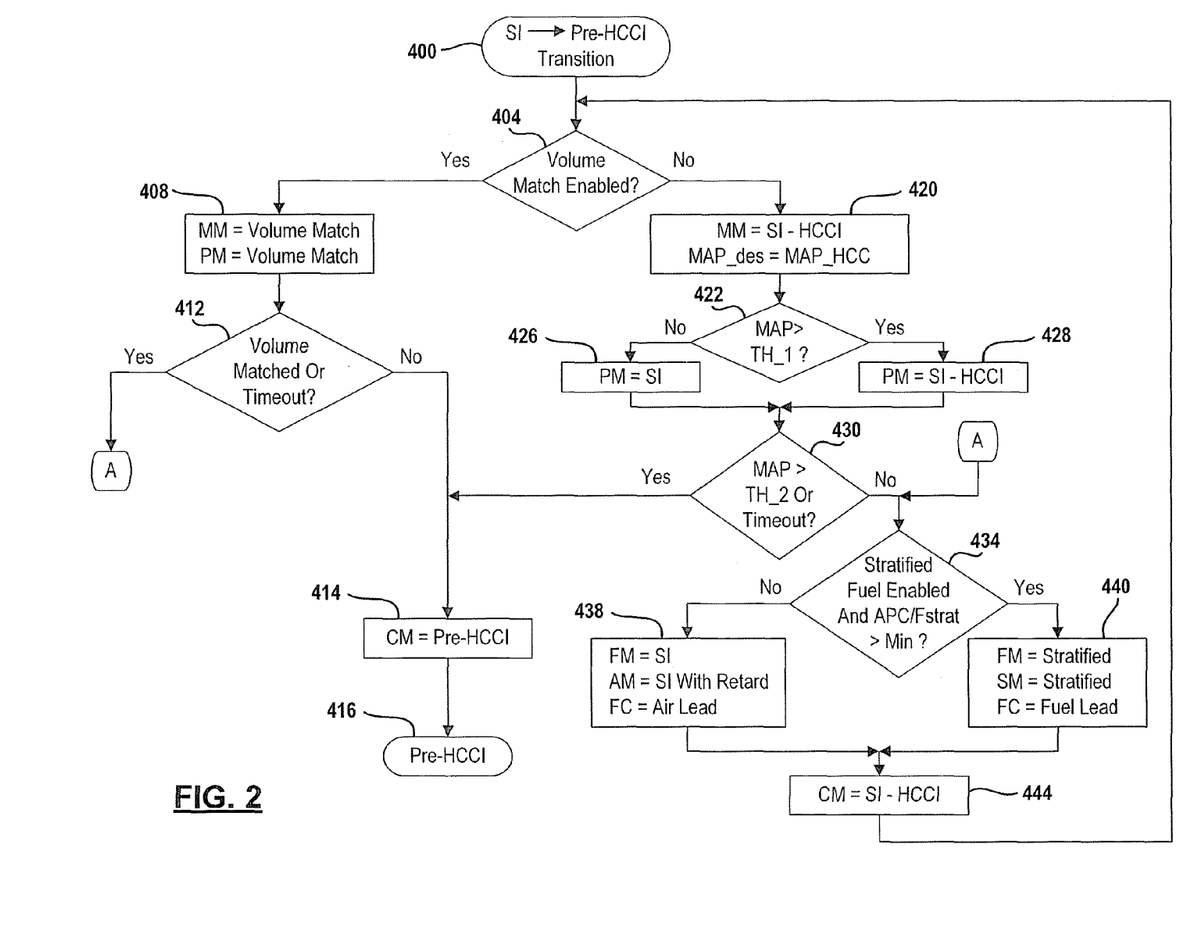
FIG. 2 illustrates steps of a method for transitioning from the SI mode to a pre-HCCI mode.
Figure 3:
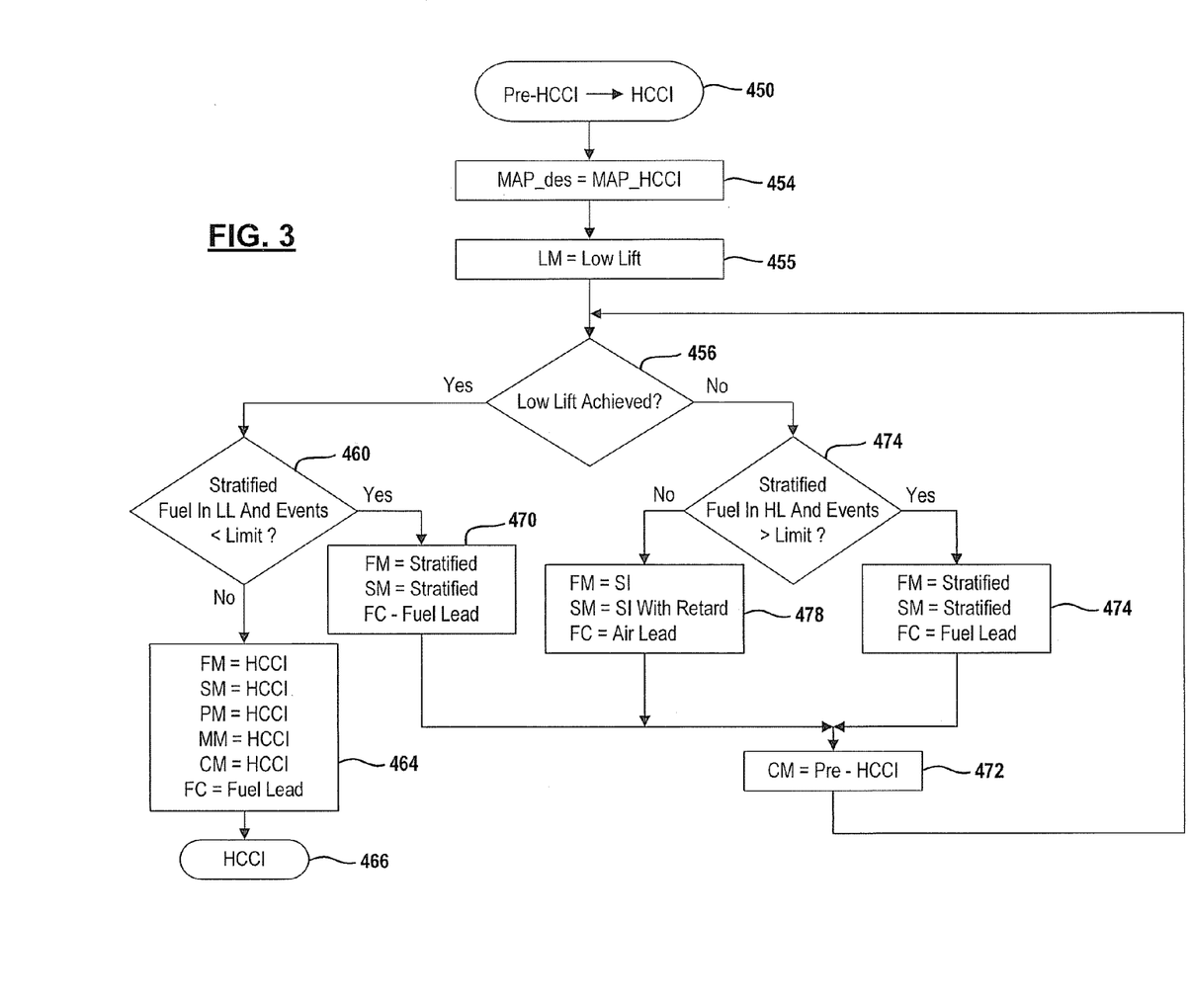
FIG. 3 illustrates steps of a method for transitioning from the pre-HCCI mode to the HCCI mode.

Referring now to FIGS. 2 and 3, when transitioning from the SI mode to the HCCI mode, the control system first transitions from the SI mode to a pre-HCCI mode (FIG. 2) and then from pre-HCCI mode to the HCCI mode (FIG. 3).

In FIG. 2, the transition from the SI mode to the pre-HCCI mode is shown. In step 400, control initiates a transition from the SI mode to the pre-HCCI mode. In step 404, control determines whether volume match is enabled. If step 404 is true, control continues with step 408 and sets the map control mode (MM) equal to volume match mode and the phaser control mode (PM) equal to the volume match mode. When volume matching is enabled, the cam phasers are used to match air charge as the lift state of the intake and/or exhaust valves are switched such as from the high lift state to the low lift state. This transition changes the air charge that may be partially offset by using the cam phaser position, which will minimize torque disturbances.

In step 412, control determines whether volume match occurred or a predetermined timer period is up. If step 412 is true, control continues with step 414 and sets the combustion mode (CM) equal to the Pre-HCCI mode. In step 416, the engine operating mode is set equal to Pre-HCCI mode.

If step 404 is false and volume matching is not enabled, control continues with step 420 and sets the map control mode (MM) to transition from the desired SI MAP to the desired HCCI MAP. Desired MAP (MAP_des) is set equal to MAP_HCCI. In FIG. 2, MM=SI-HCCI refers to transitioning MAP from the SI MAP value to the HCCI MAP value. Alternately, a separate calibration between the SI value and the HCCI value may be used. These values may be accessed using a lookup table.

In step 422, control compares MAP to a first MAP threshold ($MAP_{TH\_1}$). If MAP is not greater than $MAP_{TH\_1}$, control continues with step 426 and sets the phaser control mode (PM) to the SI mode. If step 422 is true, control sets the phaser control mode (PM) to transition from the SI mode to the HCCI mode. Control continues from steps 426 and 428 with step 430.

In step 430, control determines whether MAP is greater than a second MAP threshold $MAP_{TH\_2}$ before a predetermined timeout occurs. If step 430 is true, control continues with step 414. If steps 430 or 412 are false, control continues with step 434. In step 434, control determines whether stratified fuel is enabled and air per cylinder (APC)/$F_{strat}$ is greater than a minimum threshold. In other words, the APC divided by stratified fuel (or air to fuel (A/F) ratio) is greater than a minimum threshold.

If step 434 is false, control sets the fuel delivery mode (FM) to SI mode, the spark delivery mode (SM) to SI mode with retard, and the fuel calculation mode (FC) is set to air lead mode in step 438. In other words, torque is being controlled with spark retard at this point.

If step 434 is true, control sets the fuel delivery mode (FM) to stratified, the spark delivery mode (SM) to stratified, and the fuel calculation mode (FC) to fuel lead mode in step 440. Control continues from steps 438 and 440 with step 444 where control sets the combustion mode (CM) to transition from the SI mode to the HCCI mode.

Referring now to FIG. 3, a method for transitioning from the pre-HCCI mode to the HCCI mode is shown. Control begins with step 450 when a transition from Pre-HCCI mode to HCCI mode is needed. This occurs whenever the engine operating mode transitions to the pre-HCCI mode. In step 454, control sets MAP_des equal to MAP_HCCI and control commands low lift with LM=Low Lift.

In step 456, control determines whether the low lift state has been achieved by the intake and/or exhaust valves. If step 456 is true, control determines whether the stratified fuel option is enabled in the low-lift state and whether a predetermined number or limit of engine events occurs (such as combustion events). If step 460 is false, control sets the fuel delivery mode (FM), the spark delivery mode (SM), the phaser control mode (PM), the map control mode (MM), and the combustion mode (CM) to the HCCI mode and the fuel calculation mode (FC) to the fuel lead mode. Control continues with step 466 and sets the engine operating mode equal to the HCCI mode.

If step 460 is true, control sets the fuel delivery mode (FM) and the spark delivery mode (SM) to the stratified mode and the fuel calculation mode (FC) to fuel lead mode. Control continues from step 470 with step 472 where control sets the combustion mode (CM) equal to the pre-HCCI mode. Control returns from step 472 with step 456.

If step 456 is false, control continues with step 474, determines whether the stratified fuel is in the high-lift state and determines whether a predetermined number (or limit) of engine events has occurred (such as combustion events). If step 474 is false, control continues with step 478 and sets the fuel delivery mode (FM) equal to the SI mode, the spark delivery mode (SM) equal to the SI mode with retard, and the fuel calculation mode (FC) equal to the air lead mode. If step 474 is true, control sets the fuel delivery mode (FM) and the spark delivery mode (SM) equal to the stratified mode and the fuel calculation mode (FC) to the fuel lead mode. Control continues from steps 478 and 474 with step 472.

Figure 4:
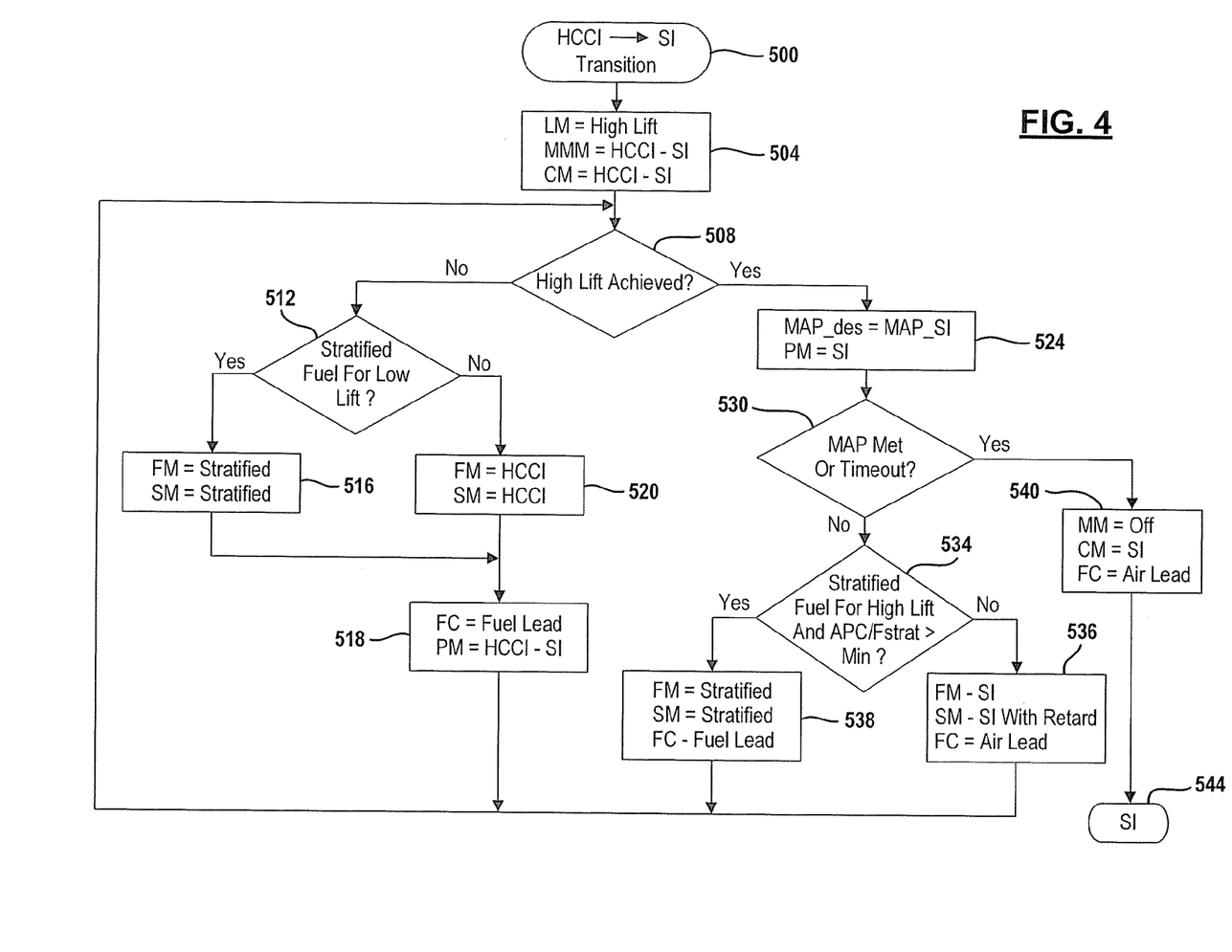
FIG. 4 illustrates steps of a method for transitioning from the HCCI mode to the SI mode.

Referring now to FIG. 4, a method for transitioning from the HCCI mode to the SI mode is shown. When the transition from the HCCI mode to the SI mode is requested in step 500, control continues with step 504 and commands the high-lift state with LM=High. Control sets the map control mode (MM) and the combustion mode (CM) to transition from the HCCI mode to the SI mode.

In step 508, control determines whether the high lift state has been achieved. If step 508 is false, control continues with step 512 and determines whether stratified fuel for low lift is true. If step 512 is true, control sets the fuel delivery mode (FM) and the spark delivery mode (SM) equal to the stratified mode. If step 512 is false, control sets the fuel delivery mode (FM) and the spark delivery mode (SM) to the HCCI mode. Control continues from step 516 and 520 with step 518 and sets the fuel calculation mode (FC) to fuel lead mode and the phaser control mode (PM) to transition from the HCCI mode to the SI mode. Control continues with step 508.

If step 508 is true, control sets MAP_des=MAP_SI and the phaser control mode (PM) to the SI mode. In step 530, control determines whether a MAP threshold is met or a predetermined timeout occurred. If step 530 is false, control continues with step 534 and determines whether stratified fuel for highlift state is true and APC/$F_{strat}$ is greater than a minimum threshold.

If step 534 is true, control continues with step 538 and sets the fuel delivery mode (FM) and the spark delivery mode (SM) to the stratified mode and the fuel calculation mode (FC) to the fuel lead mode. Control continues with step 508. If step 534 is false, control sets the fuel delivery mode (FM) to the SI mode, the spark delivery mode (SM) to the SI mode w/retard, and the fuel calculation mode (FC) to the air lead mode. Control continues with step 508.

If step 530 is true, control continues to step 540 and turns the map control mode (MM) off and the combustion mode (CM) to the SI mode and fuel calculation mode to air lead mode. In step 544, control sets the engine operating mode equal to SI.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for an engine comprising:
   a spark ignited (SI) control module controlling the engine in an SI mode;
   a pre-homogeneous charge compression (HCCI) module controlling the engine in an HCCI mode after the SI mode; and
   an HCCI module controlling the engine in an HCCI mode after the pre-HCCI mode,
   wherein the SI control module controls the engine in the SI mode after the HCCI mode.

2. The control system of claim 1 wherein the SI control module changes engine control from the spark ignited mode to the HCCI mode in the pre-HCCI module using volume matching or manifold absolute pressure mapping.

3. The control system of claim 1 wherein the pre-HCCI module sets a manifold absolute pressure to an HCCI manifold pressure.

4. The control system of claim 1 wherein the HCCI module controls the engine when low lift is achieved and stratified fuel is in a low lift state.

5. The control system of claim 1 wherein the HCCI module changes engine control from the HCCI mode to the SI mode at the SI control module when changing a manifold absolute pressure control mode and a combustion mode to an HCCI-SI mode.

6. The control system of claim 5 wherein the SI control module enters the SI mode when high lift is achieved.

7. A method of controlling an engine comprising:
   changing engine control from a spark ignited (SI) mode to a pre-homogeneous charge compression (HCCI) mode;
   changing engine control from the pre-HCCI mode to an HCCI mode; and
   changing engine control from the HCCI mode to the SI mode.

8. The method of claim 7 wherein changing engine control from the SI mode to the pre-HCCI mode comprises changing engine control from the SI mode to the pre-HCCI mode using volume matching or manifold absolute pressure mapping.

9. The method of claim 8 wherein volume matching comprises entering a MAP control mode and a cam phaser control mode for volume matching.

10. The method of claim 8 wherein manifold absolute pressure mapping comprises setting a phaser control mode to the SI mode or an SI-HCCI mode in response to a comparison of a manifold absolute pressure to a threshold.

11. The method of claim 7 wherein changing engine control from the pre-HCCI mode to the HCCI mode comprises setting a manifold absolute pressure to an HCCI manifold pressure.

12. The method of claim 11 further comprising, when low lift is achieved and stratified fuel is in a low lift state, entering the HCCI mode.

13. The method of claim 12 wherein entering the HCCI mode comprises entering a fuel lead mode and an HCCI fuel delivery mode, an HCCI spark delivery mode, an HCCI phaser control mode, an HCCI manifold absolute pressure control mode and an HCCI combustion mode.

14. The method of claim 13 further comprising, when high lift is not achieved, entering a fuel calculation mode corresponding to a fuel lead mode and a phaser control mode to an HCCI-SI mode.

15. The method of claim 7 wherein changing engine control from the HCCI mode to the SI mode comprises changing a map control mode and a combustion mode to an HCCI-SI mode.

16. The method of claim 15 further comprising, when high lift is achieved, entering the SI mode.

17. The method of claim 16 further comprising entering a phaser control mode corresponding to the SI mode.

18. The method of claim 15 further comprising turning off a map control mode when a manifold absolute pressure corresponds to an SI manifold absolute pressure.

19. The method of claim 18 further comprising setting a combustion mode to the SI mode.

* * * * *